United States Patent [19]

Petersen, III

[11] Patent Number: 4,566,649
[45] Date of Patent: Jan. 28, 1986

[54] CONVERSION CONTROL FOR COMBINATION VSI AND ALR RETRACTOR

[75] Inventor: Carl M. Petersen, III, Drayton Plains, Mich.

[73] Assignee: Irvin Industries Inc., Rochester Hills, Mich.

[21] Appl. No.: 624,228

[22] Filed: Jun. 25, 1984

[51] Int. Cl.⁴ .................... B60R 22/36; B65H 75/48
[52] U.S. Cl. .................... 242/107.4 A; 242/107.4 R
[58] Field of Search ............ 242/107.4 A, 107.4 B, 242/107.4 C, 107.4 D, 107.7, 107.4 R; 280/806; 297/478

[56] References Cited

U.S. PATENT DOCUMENTS

| | | | |
|---|---|---|---|
| 3,862,726 | 1/1975 | Ulrich et al. | 242/107.4 B |
| 4,327,882 | 5/1982 | Frankila et al. | 242/107.4 A |
| 4,436,255 | 3/1984 | Matsui et al. | 242/107.4 A |

Primary Examiner—Stuart S. Levy
Assistant Examiner—Katherine Jaekel

[57] ABSTRACT

Combination vehicle sensitive inertia and automatic locking retractor responsive to full extraction and slight retraction of retractor webbing to establish automatic locking mode and responsive to partial retraction beyond operative connection extension to establish vehicle sensitive inertia mode. Reel driven control gearing with means for actuating lost motion pivoted cam segment, control transition and range of respective ALR and VSI modes of operation.

6 Claims, 6 Drawing Figures

CONVERSION CONTROL FOR COMBINATION VSI AND ALR RETRACTOR

BACKGROUND OF THE INVENTION

As set forth in copending application Ser. No. 561,323, now U.S. Pat. No. 4,552,319 child restraint systems for automobiles are frequently designed to employ conventional seat belt and shoulder harness for strapping the child onto a child's seat placed on a conventional passenger seat, or in the case of children who do not require an auxiliary child's seat, the harness may be applied to the child as in the case of an adult. In either case, where the child's feet do not touch the floor of the vehicle, the belt and shoulder harness restraining system may be required to hold the auxiliary seat, or child without such seat, against moderate deceleration or turning of the vehicle to prevent, forward pitching or lateral auxiliary seat tipping.

Where inertia responsive retractors are employed to accommodate free forward leaning of the passenger in the absence of sudden deceleration, such systems may be ineffective to adequately restrain children, either in auxiliary seats or otherwise, where foot bracing by the child is unavailable. In order to meet this problem, various means have been employed to lock the retractor when the restraint system is applied to a child as by a manual lever, push button or other device located on the retractor housing adjacent the reel latch. Such solution has not been entirely satisfactory, particularly where the retractor housing is at an inconvenient location.

Accordingly, vehicle manufacturers have recognized the need for some means to convert a vehicle sensitive inertia (VSI) retractor to an automatic locking retractor (ALR) mode which would be convenient for the adult applying the restraint system to a child; for example, in response to fully extracting the webbing whereupon retraction by the wind up spring would ratchet the latch to an automatic locking condition when all webbing play has been taken up with the child, including an auxiliary seat, in requiring restraint position.

Applicants of said copending application have developed three alternative viable mechanical solutions to the problems posed by vehicle manufacturers, one of which is web sensitive and the other two gear drive. In each of the embodiments a conventional inertia latch mechanism is adapted to permit free reeling of the web in and out against the retraction spring with a latch bar adapted to engage ratchet teeth locking the reel against webbing extension in response to predetermined deceleration of the vehicle through an inertia latching mechanism thereby functioning in a vehicle sensitive inertia mode, (VSI).

In each of the embodiments a mechanism is provided to supplement the inertia element to bias the latch bar toward an engaging position independently of deceleration whereby the webbing is locked against extraction but can ratchet in a retraction direction under the tension of the retractor wind up spring thereby establishing an automatic locking retractor mode, (ALR), operative to restrain a child with or without an auxiliary seat chair independently of inertia forces.

In each embodiment full extension of the belt webbing is adapted to establish the ALR mode and to retain such mode upon partial retraction to a child restraining position, and until release of the child from the seat followed by full retraction of the webbing disables the automatic locking mechanism and restores the VSI mode.

In one of the embodiments the level of belt webbing wound on the reel is employed to trigger the ALR locking mechanism at both extremities with a web level sensitive finger establishing the ALR mode at the minimum radius of belt webbing corresponding to full extraction and to restore the VSI mode at maximum radius corresponding to full retraction.

In second and third preferred embodiments an extension of the reel spindle is provided with a miniature pinion gear adapted to actuate an internal ring gear through a fractional part of one revolution between full belt extraction and full retraction. In one gear embodiment an internal segmental cam on the ring gear is adapted to actuate a detent/lever mechanism for biasing the latch bar to an ALR mode or to free it for conventional VSI operation.

In the other gear embodiment, the pinion drives an annular ring having parallel external circumferential cam tracks of different radial level engaged by the finger of a lever for biasing the latch bar to an ALR mode at minimum radius and freeing it for VSI operation at minimum with a ramp transition provision between the tracks at the extremities of belt extraction and retraction.

Such prior constructions did not include a provision for overtravel in the VSI mode following its initial re-establishment upon partial retraction of webbing beyond operative belt connection extension, such as desirable to accommodate loss of stop button limiting webbing retraction upon engaging a cover slot. In addition there was no provision for delaying transition to ALR mode upon full webbing extraction, pending a slight retraction, as has proved disirable to assure proper operation under all tolerance variations of assembly.

BRIEF DESCRIPTION OF THE INVENTION

In addition to providing overtravel for VSI mode and slight delay during initial retraction for establishing the ALR mode, the present invention replaces the dual track having differential levels of the prior preferred embodiment with a simple pivoted sector having improved reliability in operation, capability of component manufacturing, ease of assembly, and compatability with tolerance variations.

DESCRIPTION OF PREFERRED EMBODIMENT

Figure 1:
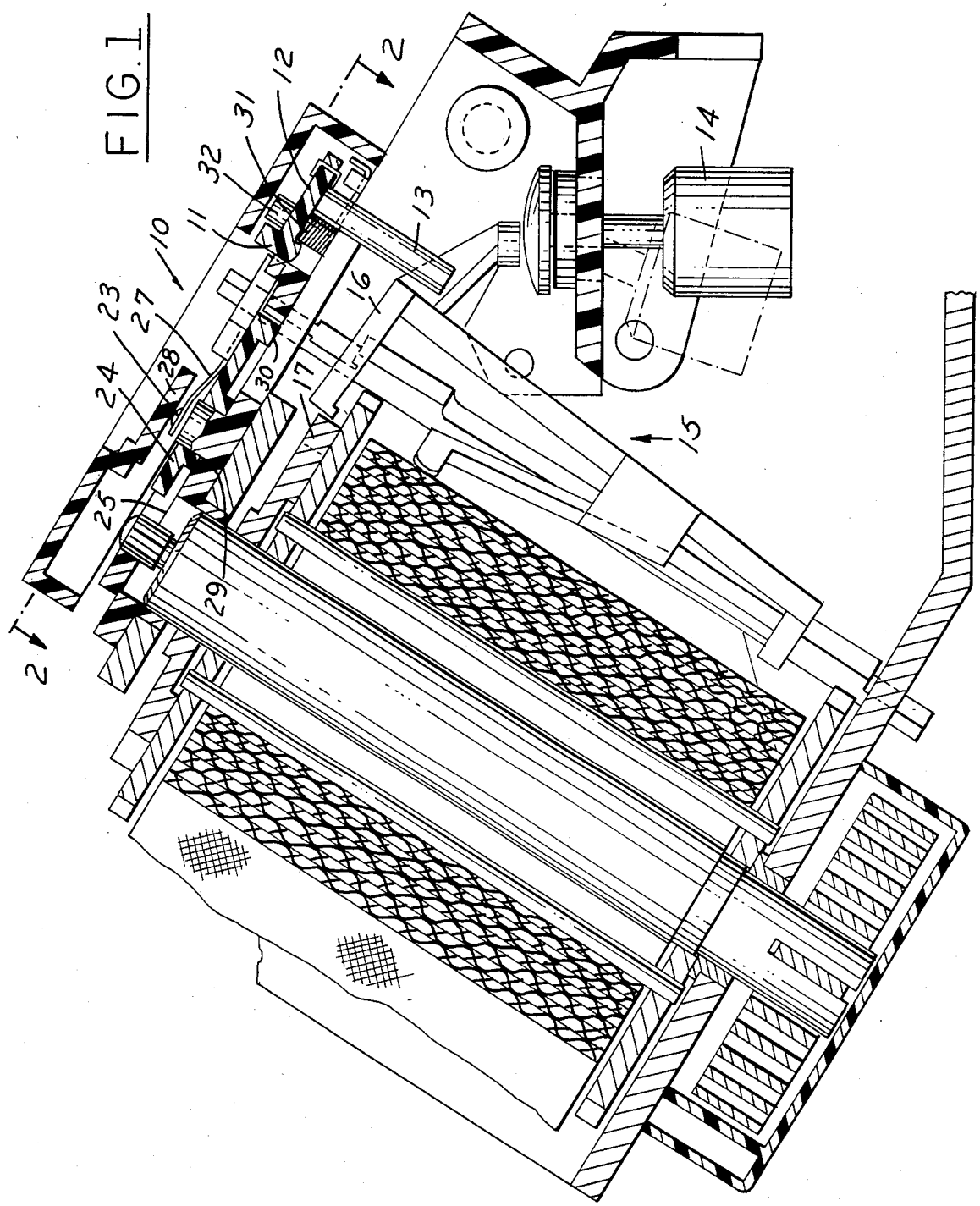
FIG. 1 is a sectional view of a belt retractor incorporating a preferred embodiment of gear actuated VSI-/ALR conversion mechanism.
Figure 4:
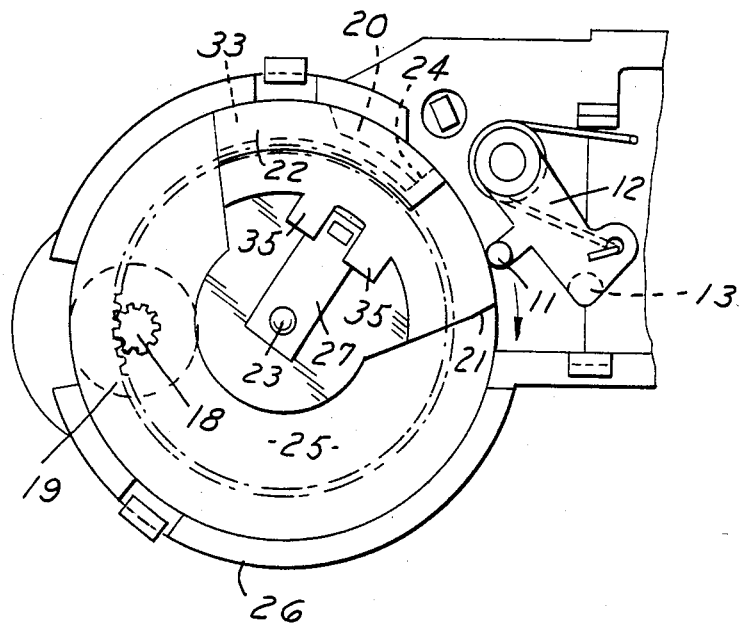
FIG. 4 is a view similar to FIGS. 2 and 3 illustrating a further shift in the control elements.
Figure 5:
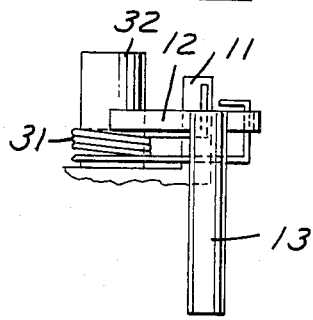
FIG. 5 is a fragmentary view of the control lever per se.

With reference to FIG. 1 a belt retractor, generally similar to the one illustrated in FIG. 4 of copending application Ser. No. 524,422, filed Aug. 18, 1983, is shown with a gear actuated VSI/ALR conversion mechanism generally indicated at 10 adapted through cam follower 11 to control the position of lever 12 with its depending finger 13 shown in its inactive position. This corresponds to VSI mode under control of inertia element 14 for actuating element 15 to effect latch lock against belt extraction under emergency deceleration conditions. Movement of lever 12 and finger 13 to urge pawl 16 into engagement with ratchet teeth 17 will effect conversion to ALR mode preventing belt extraction independently of vehicle deceleration.

Figure 2:
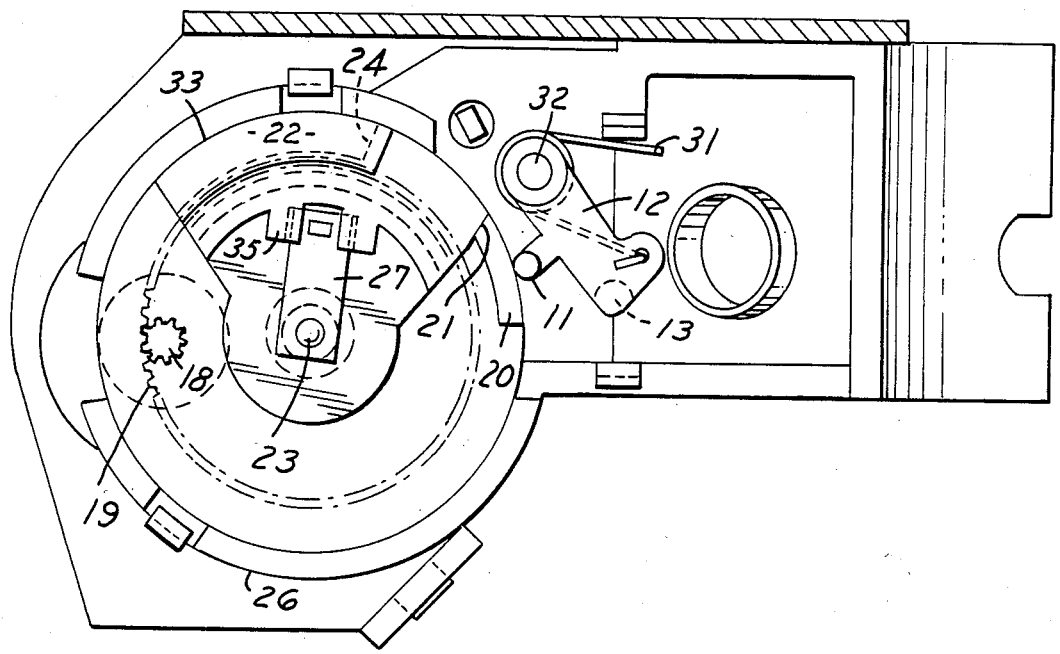
FIG. 2 is an end view of the gear actuated conversion mechanism taken along the line 2—2 of FIG. 1.
Figure 3:
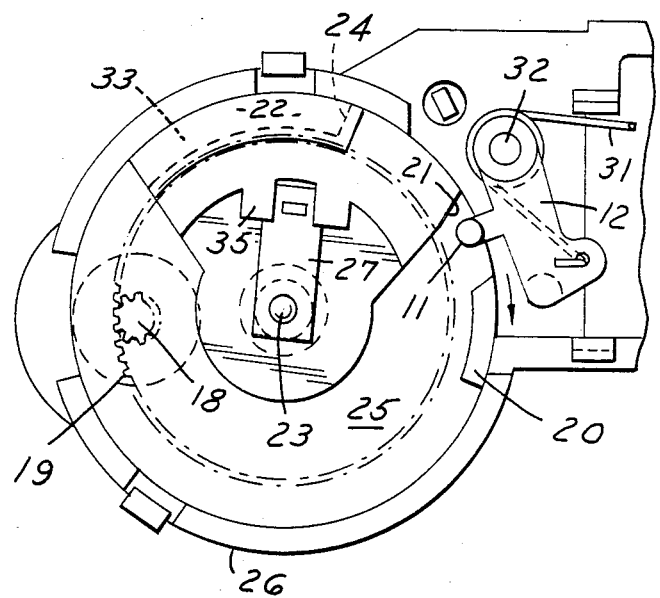
FIG. 3 is a view similar to FIG. 2 illustrating a shift in mode of operation.

With reference to FIGS. 2 and 3, control of lever 12 and finger 13, in converting between VSI mode illustrated in FIG. 2 and ALR mode of FIG. 3, is effected by drive through pinion 18 of ring gear 19 molded with projection 20 on its perimeter adapted to engage shoulder 21 of sector cam slide 22 pivoted at 23 as shown in FIG. 2 and, upon actuation of gear 19 in a clockwise direction, to engage opposite shoulder 24 as illustrated in FIG. 4. Sector 22 operates as a pivoted slide held in frictional engagement with stationary base 25 of housing 26 by leaf spring 27 depressed by cover 28 to establish contact with base 25 at the pivot area 29 and perimeter area 30 so as to retain a static position unless and until actuated by projection 20 of gear 19.

FIG. 2 illustrates the conversion control at the extremity of belt extraction with lever 12 and finger 13 retained in an inactive position until the belt is slightly retracted, sufficiently to move projection 20 to a non-blocking position as shown in FIG. 3, permitting lever 12 under the bias of spring 31 to move in a clockwise direction about pivot 32 causing finger 13 to actuate pawl 16 into engagement with ratchet teeth 17. Further belt retraction under the ratcheting of pawl 16 will occur under the ALR mode preventing belt extraction, independently of inertia weight 14, from any retracted position until projection 20 of gear 19 reaches shoulder 24 moving slide 22 to a position where its shoulder 21 engages cam follower 11 moving lever 12 in a counter clockwise direction to its inactive position shown in FIG. 4 thereby re-establishing the VSI mode under the control of inertia weight 14.

Lost motion of projection 20, moving in a counter-clockwise direction during belt extraction and in a clockwise direction during belt retraction between extremity positions for actuating cam follower 11, permits the conversion control to retain the prevailing VSI or ALR mode at all intermediate positions of belt retraction and extension.

The extent of sector 22 in a counterclockwise direction beyond shoulder 24 establishes a provision for substantial overtravel in VSI mode webbing retraction after such mode has been re-established as illustrated in FIG. 4

At the other extremity of travel of projection 20 to the position shown in FIG. 2, corresponding to full extension of the belt, the VSI mode is retained by projection 20 following shoulder 21 until a slight retraction of the webbing moves projection 20 to the position shown in FIG. 3 to establish the ALR mode. Such slight retraction is desirable to prevent possible malfunction if the transition were to take place somewhat before or at the full belt extension position of gear 19 under commercial tolerance and assembly variations.

The control must stay in the ALR mode at least until a predetemined point of belt retraction is reached corresponding to restraining belt end connection with minimum belt extension. This is required since certain child seats involve relatively nominal belt extraction for restraint beyond that involved in making a minimum extension belt connection. Once the webbing has retracted beyond the point of any possible belt connection, there must be a return to the VSI mode of operation before reaching a predetermined point in the webbing retraction where a restraining button on the webbing prevents further entry into the cover slot. As a failsafe provision for a case where the stop button is dislodged, sufficient overtravel is provided in the VSI mode to permit full retraction of the belt webbing in order to prevent locking in the stowed position which would occur if the ALR mode were reached.

Sector 22 together with gear drive of projection 20 is ideally adapted to provide optimum transition points, both in extraction to full belt extension with slight return to extablish ALR mode as well as the point of minimum retraction to re-establish VSI mode with overtravel to accommodate full retraction without departure from VSI mode.

Figure 6:
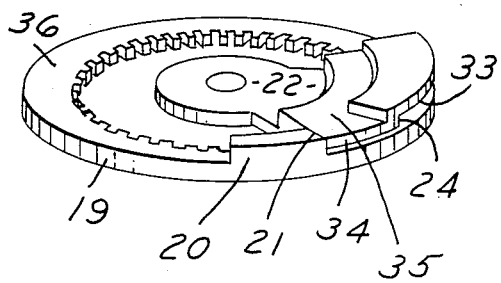
FIG. 6 is a perspective view of the principal control elements employed in the FIGS. 1-6 embodiment.

The critical elements of the control are illustrated in the perspective view of FIG. 6 wherein it is seen that ring gear 19 is in the form of a flat washer, with internal ring gear teeth, provided with projection 20 high enough to engage shoulders 21 and 24 but low enough to pass under ledge 33 in reaching shoulder 24. Cam follower 11, on the other hand, extends vertically low enough to engage the outer periphery of projection 20 and the outer periphery 34 of ledge 35 terminating in shoulder 21, as well as high enough to engage the outer periphery of ledge 33; but is short enough to clear the upper surface 36 of gear 19 when not blocked by projection 20 or sector periphery 34.

Leaf spring 27 illustrated in FIGS. 1 and 4, omitted for clarity in FIG. 6, is assembled in a slot within ears 35 molded in the plastic sector 22 and, as indicated above, is compressed by cover 28 to frictionally retain sector 22 against stationary base surface 25 pending actuation by gear projection 20. Clearance between all other relatively moving surfaces of gear 19 and sector 22 assure absence of drag during lost motion movement of projection 20.

I claim:

1. Combination vehicle sensitive inertia, and automatic locking retractor, comprising a vehicle sensitive inertia retractor having spring wind-up webbing reel means with a ratchet and a latch bar normally actuated by inertia means for locking the reel means against webbing extraction, and supplemental means biasing the latch bar toward extraction locking ratchet engagement in response to full webbing exrtraction beyond occupant restraining position to cause said retractor upon webbing ratcheting spring wind-up to a passenger restraining position to automatically lock in an automatic locking retractor mode without inertia actuation, said supplemental means including gearing responsive to reel rotation for sensing full webbing extraction and retraction, a projection from said gearing operative at the extremity of webbing extraction to retain the vehicle sensitive inertia mode of operation until a predetermined amount of reverse actuation of said gearing moves said projection to an inoperative position, thereby delaying transfer to automatic locking retractor mode during a slight retraction of webbing from full extension, and means for restoring normal vehicle sensitive inertia operation upon full belt retraction beyond occupant restraining position, where, in the combination, pivoted slide means actuated by said projection establishes the prevailing vehicle sensitive inertia and automatic locking retractor modes of operation, said pivoted slide means including an arcuate segment actuated in either clockwise or counter-clockwise direction by said projection at the extremities of gearing travel corresponding to webbing extraction and retraction, means within a predetermined range of travel of said segment for establishing said vehicle sensitive inertia mode of operation, and means operative when said segment is outside of said predetermined range of travel for establishing said automatic locking retractor mode of operation, said projection having mounting means allowing lost motion travel between extremities where it engages said segment.

2. The combination of claim 1 including frictional means for retaining said segment in a fixed position throughout the lost motion travel of said projection.

3. The combination of claim 1 wherein said segment includes an arcuate cam perimeter, and said means for establishing automatic locking retractor mode includes a cam follower engaging said perimeter during the operative range of travel of said segment for extablishing VSI mode of operation.

4. The combination of claim 3 wherein said cam follower is engaged successively by said arcuate perimeter and said projection at the extremity of webbing extraction beyond occupant restraining position.

5. The combination of claim 3 wherein a portion of said arcuate perimeter engaged by said cam follower is bypassed by said projection during webbing retraction prior to actuating said segment to re-establish vehicle sensitive inertia from automatic locking retractor mode of operation.

6. The combination of claim 3 wherein said projection extends from the face of said gearing which otherwise provides clearance for passage of said cam follower.

* * * * *

UNITED STATES PATENT AND TRADEMARK OFFICE
CERTIFICATE OF CORRECTION

PATENT NO. : 4,566,649
DATED : January 28, 1986
INVENTOR(S) : Carl M. Petersen, III It is certified that error appears in the above—identified patent and that said Letters Patent is hereby corrected as shown below:

Column 2, line 24, "minimum" should be --maximum--

Signed and Sealed this

Twenty-seventh Day of May 1986

[SEAL]

Attest:

DONALD J. QUIGG

Attesting Officer

Commissioner of Patents and Trademarks